United States Patent [19]

Chuang

[11] Patent Number: 4,986,302
[45] Date of Patent: Jan. 22, 1991

[54] VALVE OF DIRECT PASSAGE TYPE WHICH IS RESPONSIVE TO FLUID PRESSURE

[76] Inventor: Rong-Chao Chuang, No. 113, Nan-Yang Rd., Nan-Tsu; Kaohsiung City, Taiwan

[21] Appl. No.: 465,793

[22] Filed: Jan. 16, 1990

Related U.S. Application Data

[63] Continuation-in-part of Ser. No. 318,686, Mar. 3, 1989, abandoned.

[51] Int. Cl.$^5$ .............................................. F16K 31/48
[52] U.S. Cl. ............................... 137/495; 137/624.12; 251/231; 251/251
[58] Field of Search ...................... 137/624.11, 624.12, 137/495; 251/229, 251, 263, 257, 231, 244

[56] References Cited

U.S. PATENT DOCUMENTS

| | | | |
|---|---|---|---|
| 3,880,190 | 4/1975 | Boss | 137/624.12 |
| 4,335,852 | 6/1982 | Chow | 137/624.12 X |
| 4,508,142 | 4/1985 | Eburn | 251/229 X |
| 4,787,416 | 11/1988 | Chaung | 137/624.12 |

*Primary Examiner*—Alan Cohan
*Attorney, Agent, or Firm*—Leonard Bloom

[57] ABSTRACT

A valve of direct passage type which is responsive to fluid pressure comprises a valve disc normally shut with fluid which is installed in front of outlet port of the valve body and a bell crank pivoted therein to engage and open or close the valve disc. The bell crank is activated by a cam mechanism which has a camshaft extending upwardly through the center of the valve body. The valve may be moved from a fully opened to a fully closed position and all intermediate points therebetween.

11 Claims, 6 Drawing Sheets

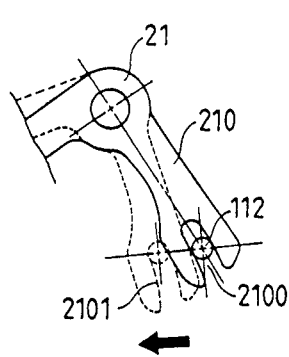
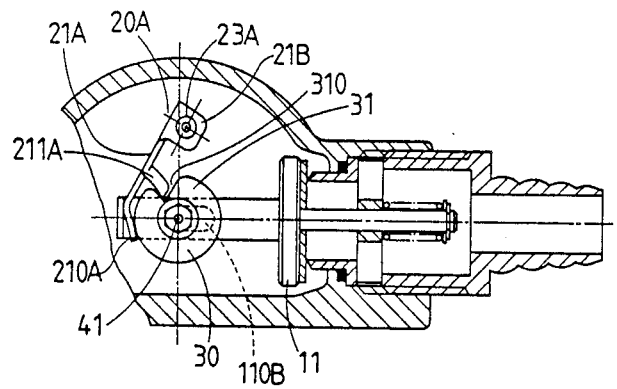
FIG-8     FIG-9
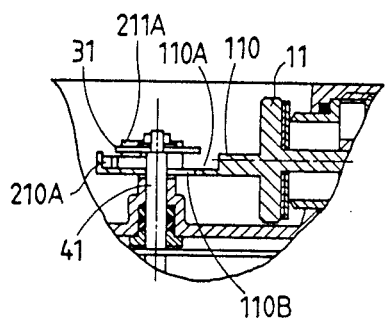
FIG-10

VALVE OF DIRECT PASSAGE TYPE WHICH IS RESPONSIVE TO FLUID PRESSURE

CROSS-REFERENCE TO RELATED APPLICATIONS

This application is a continuation-in-part of co-pending application Ser. No. 318,686 filed on Mar. 3, 1989, now abandoned, the disclosure of which is incorporated by reference herein in its entirety.

FIELD OF THE INVENTION

This invention relates to a valve of direct passage type which normally shut with fluid pressure, especially suitable to be installed in the natural gas pipes in the low pressure ends of the piping system.

BACKGROUND OF THE INVENTION

Currently, the valve of the prior art for shutting off gas flow is utilized in ordinary households, such as disclosed in U.S. Pat. No. 4,787,416 issued to the applicant, entitled "REGULATOR MEANS FOR AUTOMATICALLY SHUTTING PIPELINE PASSAGE OFF DURING PRESSURE REDUCING FAILURE". This valve permits natural gas therein to flow through the inlet of the valve to enter the transition room at the nozzle, and into the paths of the controlling valve by way of the exit of the transition room. Thus, the gas flows directly to the gas fixture. According to the paths of the gas flow, it is clear that the flow ways in the valve are not only narrow but not direct so as to reduce the flow badly. This reduces the pressure of the flow in some degree to diminish the fire on the gas fixture when the gas flows through the valve. The gas fixtures of the users, with connecting pipes to the low pressure ends of the natural gas piping systems, can scarcely get the gas at a peak use time such as in the evening when every family is cooking dinner. The above-mentioned disadvantages of the prior art make the valve unsuited to work under every condition and lead to design for an improvement.

SUMMARY OF INVENTION

The primary object of the present invention is to provide a valve of direct passage type which is responsive to fluid pressure which is particularly suitable to be fitted in ends of the natural gas piping systems or in a piping system possessing weak fluid pressure.

It is another object of provide a valve of direct passage type which is responsive to fluid pressure, which is adjustable freely with opening of a valve disc according to the length of a rocker (bell crank) arm or to the depth of a cam slot of a cam mechanism, to keep the pressure of gas flow constant.

It is a further object to provide a valve of direct passage type which is responsive to fluid pressure, wherein, a cam slot of the cam mechanism, receives the rocker arm which transmits movement to the valve with minimal loss of energy to provide improved accuracy and stability.

It is still a further object to provide a valve of direct passage type which is responsive to fluid pressure, wherein the rocker arm is received by the valve disc and the valve is moved by the rocker arm accurately without rotation.

These and other objects of the present invention will become apparent from a reading of the following specification, taken in conjunction with the enclosed drawings.

BRIEF DESCRIPTION OF THE DRAWINGS

FIG. 8 is a partial enlarged detail of the bell crank.

FIG. 9 is a partial top exploded sectional view for the forth embodiment of the present invention.

FIG. 10 is a partial exploded side view of FIG. 9.

DESCRIPTION OF THE PREFERRED EMBODIMENTS

Figure 1:
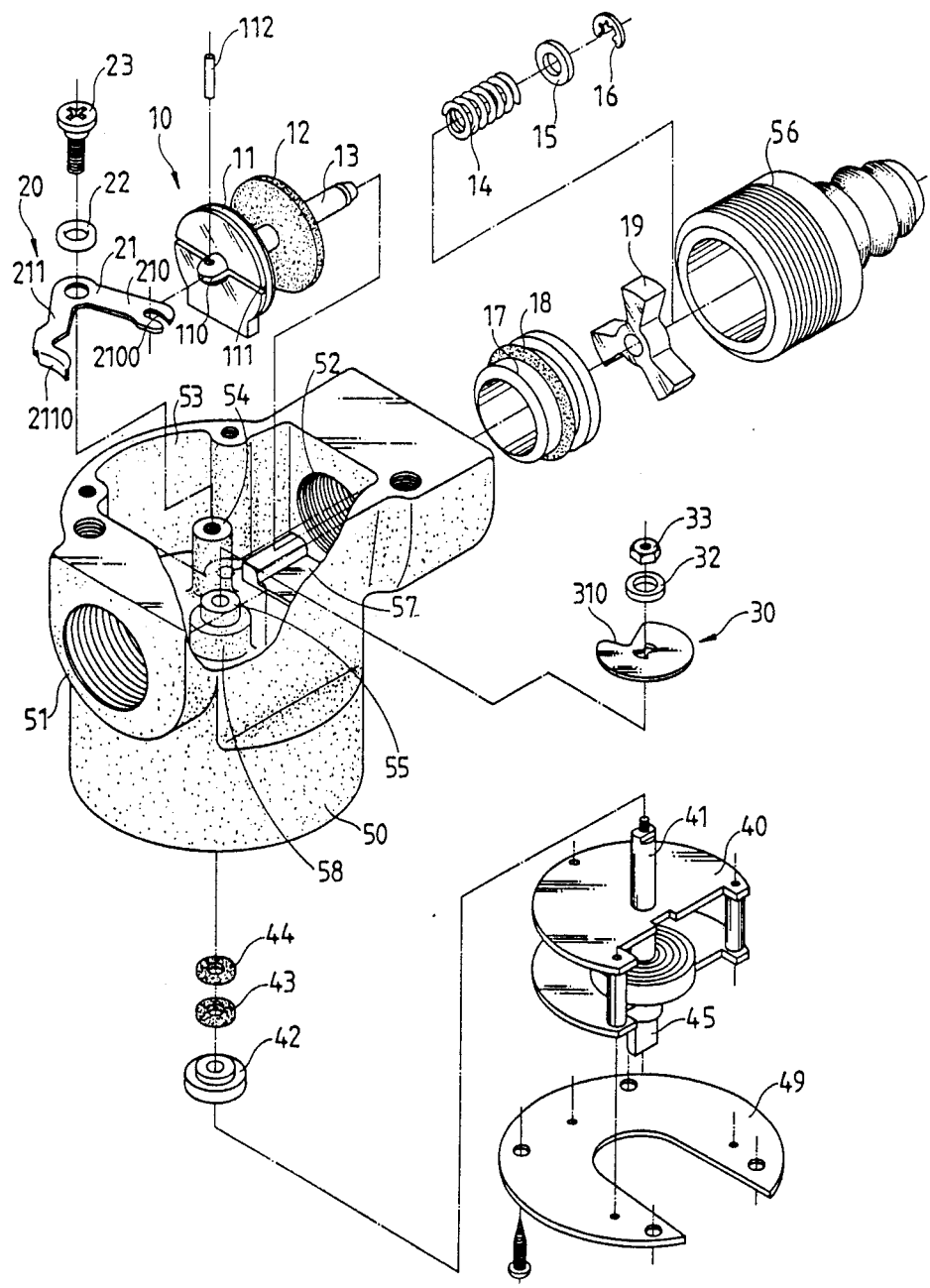
FIG. 1 is an exploded perspective view for the first embodiment of the present invention.

Referring to the drawings, the valve of direct passage type comprises a valve disc 10 automatically shut with fluid pressure, a rocker set 20 which pulls the valve disc 10 open, and a cam mechanism 30 which controls the rocker arm 20 oscillation. The cam mechanism 30 can be switched by external force, for example, manual turning or a spring of a timer. Generally, the cam mechanism 30, when turned away from an original position by external forces, will countdown and revert gradually to stop. The original position of the cam mechanism 30 is also the position in which the passage is shut by the valve disc 10. According, the valve disc 10, the rocker arm 20 and the cam mechanism 30 have an interrelation which will be described later.

Figure 2:
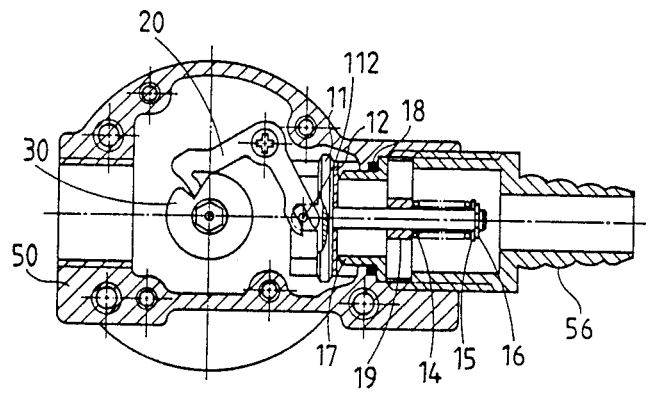
FIG. 2 is a top transverse view for the first embodiment of the present invention.
Figure 3:
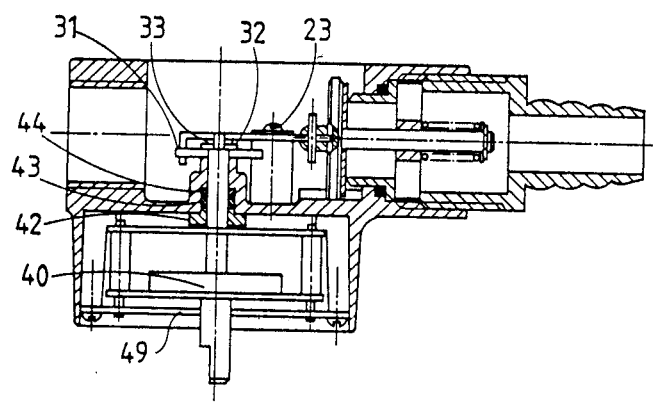
FIG. 3 is a sectional side elevation view of FIG. 2.

The first embodiment (FIGS. 1 to 3) has a valve body 50 which includes: an inlet port 51, an outlet port 52, a valve chamber 53, a first column 54, a second column 55 and a pipe joint 56, wherein, the valve disc 10 is mounted on the outlet port 52 (FIGS. 2, 3), and also comprises: a main plate 11, a packing 12, a valve stem 13, a spring 14, a washer 15, a C-type retainer 16, a valve seat 17, an O-ring 18 and a stem guide 19. The stem guide 19 has at least two arms and a hub with an opening in the hub. The valve stem 13 is preformed with the main plate 11, and extends through the outlet port 52, the valve seat 17 and the stem guide 19 to be held in series with the spring 14, the washer 15 and the C-type retainer 16. Therefor, the valve stem 13 is retained with the stem guide 19 to shut the outlet port 52 normally according to the direction of fluid flow. The stem guide 19 is attached to the valve body 50 with the pipe joint 56 screwed forward to the inner thread of the outlet port 52. An eye plate 110 protrudes forwardly from the front side of the main plate 11. A slot 111 is formed transversely across the main plate 11.

The rocker set 20 is composed of a rocker (bell crank) 21, a washer 22 and a screw 23 which fixes the rocker set 20 upon the first column 54, wherein, the rocker arm 21 has a first arm portion 210 and a second arm portion 211. The end of the first arm portion 210 is bifurcated having a notch 2100 therein (FIG. 8) with a curved inner edge 2101. The end of the first arm portion 210 is received into the slot 111 of the eye plate 110 and pivoted therein by a pin 112. The end of the second arm portion 211 has a hook shape 2110 and is received in a cam slot 310 of the cam mechanism 30. Preferably the pin 112 and the rocker arm 20 may be changed in size (e.g. may be scaled larger or smaller).

A cam 31 is keyed with a timer 40 by a washer 32 and a nut 33 on a transporting shaft 41 of the timer 40 which extends upwardly through the second column 55 and is held closely by a washer 42, and two O-rings 43, 44 respectively. The timer 40 is connected beneath the valve body 50 by a fixed panel 49. The lower portion 45 of the transporting shaft 41 extends out of the fixed panel 49 to be adjusted. Preferably, it is possible for the cam mechanism 30 to be switched by an external force. Thus, the second arm portion 211 of the rocker arm 21 leaves from the cam slot 310 and opens the valve disc 10.

Since the first arm portion 210 and the second arm portion 211 are connected on the same plane (FIGS. 2, 3), the movement of, and the extent of movement of the main plate 11 are proportional to the depth of the cam slot 310. Thereby, the depth can be modified in accordance with practical necessities. In this manner, the valve may be moved from a fully opened to a fully closed position and all intermediate points.

Figure 4:
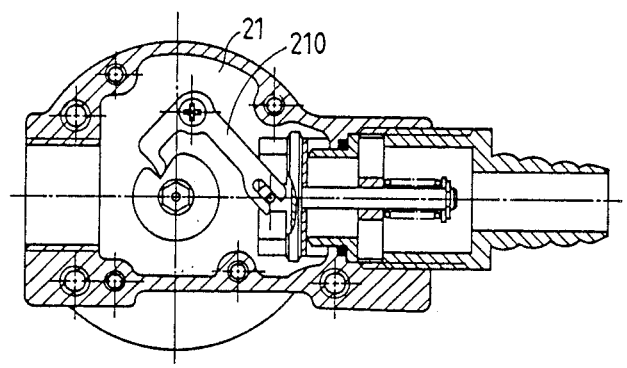
FIG. 4 is a top transverse view for the second embodiment of the present invention.
Figure 5:
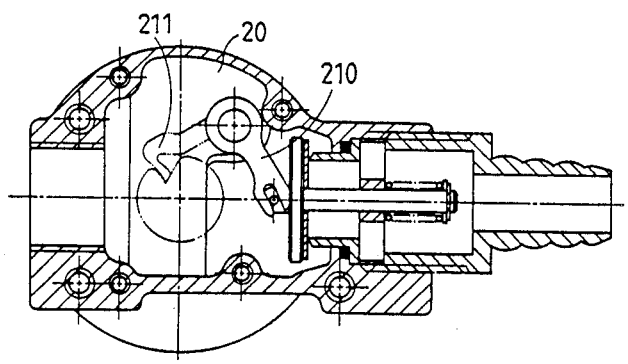
FIG. 5 is a top transverse view for the third embodiment of the present invention.
Figure 6:
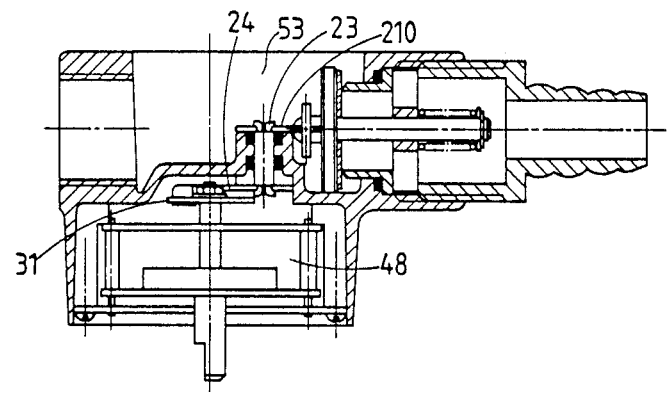
FIG. 6 is a sectional side elevation view of FIG. 5.
Figure 7:
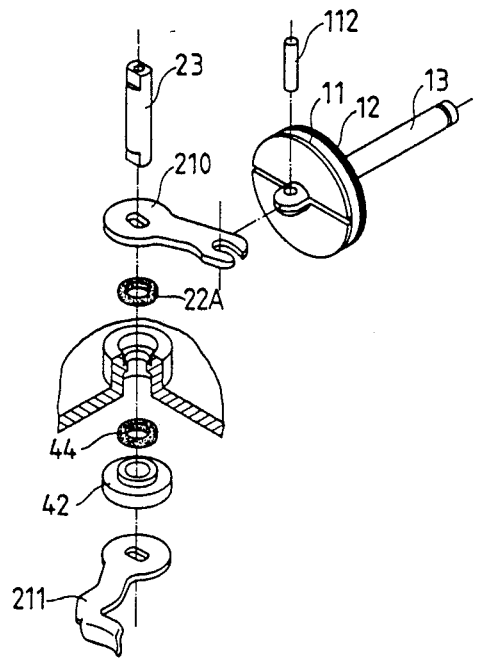
FIG. 7 is an exploded perspective view of the rocker arm of the third embodiment.
Figure 11:
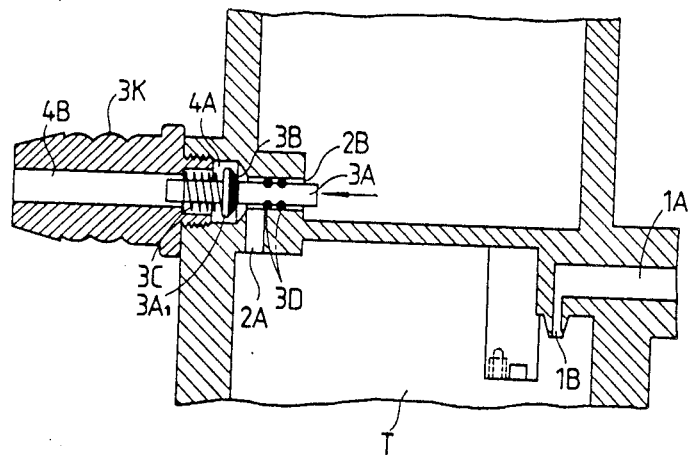
FIG. 11 is a partial exploded side view of U.S. Pat. No. 4,787,416.

The second embodiment has the same structure as the first embodiment substantially (FIG. 4). However the length of the first arm portion 210 is double, and so, if the second arm portion 211 moves one unit in depth, the first arm portion 210 will move two units in distance. It means the range for the opening is double and the resistance of the fluid is less. Alternately, the rocker set of the third embodiment is in a form in which the first arm portion 210 and the second arm portion 211 are on two different planes respectively (FIGS. 5 to 7). The first arm portion 210 is installed in the valve chamber 53, and the second arm portion 211 is installed in a timer chamber 48. A connecting shaft 23 connects the first arm portion 210 and the second arm portion 211 at the two ends of the shaft 23 (FIG. 6). For airtight purpose, an O-ring 22A is attached below the first arm portion 210, and a washer 42, and an O-ring 44 is disposed above the second arm portion 211. In this manner the rocker arm 21 which has two arm portions installed in different chambers still performs the same function with the cam mechanism 30 and the main disc 11 as in the above embodiments.

Further, in the fourth embodiment, a rocker set 20A is actuated indirectly (FIGS. 9, 10). It includes: a main body 21A and a pivot 23A, wherein, the main body 21A has a pivotal portion 21B, a first protrudent arm 210A and a second protrudent arm 211A positioned in the same direction and on the same side with the first arm 210A. The elbow portion of the first protrudent arm 210A touches an outer side of a rectangular slot 110A connected with a protrudent shaft 110 of the main plate 11. The second protrudent arm 211A is received in the cam slot 310. The rectangular slot 110A longitudinally forms a long hole 110B to allow the cam 31 to be fixed with a camshaft 41 which extends through the hole. Accordingly, the camshaft 41 extends across the protrudent shaft 110 and both achieve the purposes as in the above embodiments.

The second arm 211A will not be received by the cam slot 310 and will communicate the cam profile when the cam 30 is turned counterclockwise by an external force. Hence, the main body 21A will move counterclockwise to open the main plate 11 by the first arm 210A pushing the outer side of the rectangular slot 110A outwardly.

For practical purposes, a camshaft of the cam mechanism 30 can be effected by connection with the transporting shaft 41 of the timer 40 and driven simultaneously by turning the timer 40. Alternately, the camshaft may extend outwardly to be driven directly with a switch, thereby providing an ON-OFF selective function. When the cam mechanism 30 is set to work, the cam 31 is always rotated by external force, thereby pushing the second arm portion 211 causing it to leave the cam slot 310 and move counterclockwise. In this way, the first arm portion 210 will move too and pull the valve disc 10 forwardly to open the valve disc 10 to intermediate positions as determined by the movement of the cam. Furthermore, the cam 31 will revert to the original position in preset time, if the cam 31 is installed with the timer 40. Thus, the second arm portion 211 is reintroduced into the cam slot 310 and shuts the valve disc 10 off.

Figure 12:
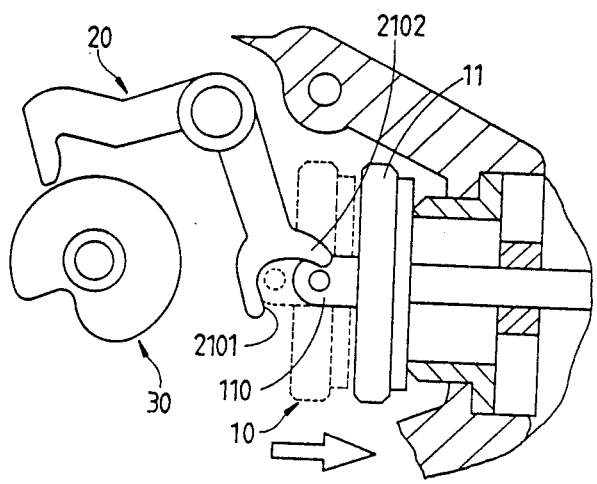
FIG. 12 is a partial enlarged detail showing the effect of increased pressure on the bell crank and closing of the valve.

Under normal conditions, when the fluid pressure is 0.01 kg/cm$^2$ for natural gas and 0.02 kg/cm$^2$ for liquid petroleum gas (LPG), the cam 30 turns and the arm 20 opens the valve disc 10. If a problem occurs in the supply of the fluid, such as a failure in the reducing valve in the pipeline of natural gas or a rupture of the rubber ring in the outlet of the LPG tank, there will be a large increase in pressure in the system. The valve 10 would be open and this surge of fluid under significantly higher pressure would introduce a safety hazard. In order to provide a safety feature to the valve, the arm 20 and the notch 2100 have been modified to respond to high pressure. When the fluid pressure becomes greater than 1 kg/cm$^2$, the notch 2100 is widened (FIG. 12). The first bifurcated arm 2102 is deformed so that the arm is no longer received in the slot 111 of the eye plate 110 sufficiently to be retained by the pin 112. Thus, the valve disc 10 is closed by the action of spring 14 and fluid is prevented from flowing through the valve. The system is a "fail-safe" system.

Obviously, many modifications may be made without departing from the basic spirit of the present invention. Accordingly, it will be appreciated by those skilled in the art that within the scope of the appended claims, the invention may be practical other than has been specifically described herein.

What is claimed is:

1. A manually-adjustable valve that may be opened for a selected time period but is responsive to excessive pressure to close the valve to prevent a potential safety hazard, comprising a valve body including an outlet port, a normally-closed valve covering the outlet port, a spring-loaded manually-adjustable timer mechanism including a rotatable cam in the valve body, a pivoted bell crank in the valve body and having a pair of arms, one of which is connected to the valve, and the other of which rides on the cam, one portion of the bell crank being deformable when subjected to a predetermined force, such that the timer mechanism may be adjusted manually to rotate the cam, thereby pivoting the bell crank and opening the valve for a selected time period, and the valve closing upon excessive pressure to deform the bell crank thereby preventing a potential safety hazard.

2. The valve of claim 1, wherein the valve has a transverse slot thereon, the one arm of the bell crank being received in the slot preventing rotational movement of the valve.

3. The valve of claim 1, further comprising:
an eye plate protruding from the valve and extending in the direction of the bell crank, the eye plate having an opening therein;
a pin being received in the opening in the eye plate;
the one arm of the bell crank being bifurcated and mounted on the pin which is in the opening in the eye plate such that the one arm of the bell crank may pivot thereon; and
such that movement of the bell crank causes movement to open and close the valve in the outlet port.

4. The valve of claim 3, wherein excessive pressure deforms the bifurcated one arm of the bell crank disconnecting the bell crank from the valve such that the valve closes.

5. The valve of claim 4, wherein pressure exceeding 1 kg/cm$^2$ causes the valve to close.

6. A direct pressure regulator which is responsive to fluid pressure comprising:
a valve body having an inlet port and an outlet port through which fluid may flow, the valve body further having a first vertical column and a second parallel vertical column;
a shaft passing through the first vertical column, the shaft having a first end extending upwardly from the column and a second end extending downwardly from the vertical column;
the second end of the shaft further extending through a first plate spaced apart from a second plate;
a timer disposed between the first and second plate and connected to the shaft;
a cam keyed to the first end of the shaft;
a bell crank having a first arm and a second arm, the bell crank pivotally mounted on the second column, the first arm of the bell crank engaging the cam;
a valve mechanism disposed in the outlet port, means for connecting the valve mechanism to the bell crank such that movement of the cam transmits movement to the bell crank, which in turn, transmits movement to the valve mechanism permitting the valve to move from a fully open to a fully closed position and all intermediate points therebetween.

7. The regulator of claim 6, further comprising the valve mechanism having a valve plate, the valve plate having a valve stem extending outwardly therefrom, the stem having an end thereon;
a circular valve seat mounted about the valve stem, the valve seat communicating with the outlet port;
a stem guide having at least two arms and a hub, the hub of the stem guide having an opening therein through which the valve stem extends;
a spring encircling the valve stem;
means for securing the spring to the end of the valve stem;
the valve plate having a transverse slot therein, the second arm of the bell crank being received in the transverse slot and preventing rotational movement of the valve disc;
an eye plate protruding from the valve plate and extending in the direction of the bell crank, the eye plate having an opening therein;
a pin being received in the opening in the opening in the eye plate;
the second arm of the bell crank being bifurcated and mounted on the pin which is in the opening in the eye plate such that the second arm of the bell crank may pivot thereon; and
such that movement of the bell crank causes movement of the valve disc to open and close the valve mechanism in the outlet port.

8. The regulator of claim 6, wherein the first arm of the bell crank is longer than the second arm of the bell crank.

9. The regulator of claim 6, wherein the first arm of the bell crank is in the same plane as the second arm of the bell crank.

10. A direct pressure regulator which is responsive to fluid pressure comprising:
a valve body having an inlet port and an outlet port through which fluid may flow, the outlet port having a diameter;
a cam mechanism mounted between the inlet port and the outlet port;
a pivoted bell crank in the valve body and having a first arm and a second arm, the first arm engaging the cam, the second arm having a bifucated end, one portion of the bell crank being deformable when subjected to a predetermined force;
a valve to close the outlet port, the valve having a valve plate, the valve plate having a transverse slot therein, the bifurcated end of second arm of the bell crank being connected to the valve plate and received in the transverse slot preventing rotational movement of the valve plate, the valve plate having a diameter greater than the diameter of the outlet port;
the valve plate having a valve stem extending outwardly therefrom, the stem having an end thereon;
a circular valve seat mounted above the valve stem, the valve seat communicating with the outlet port;
a stem guide having at lest two arms and a hub, the hub having an opening therein through which the valve stem extends;
a spring encircling the valve stem; and
means for securing the spring to the end of the valve stem;
such that movement of the bell crank in a one direction opens the valve through intermediate positions to a fully opened position to permit passage of fluid around the valve plate, through the valve seat, through the stem guide and through the outlet port and further such that increase in pressure on the valve plate deforms the bifurcated end of the second arm of the bell crank disconnecting the bell crank from the valve and urging of the spring overcomes action on the cam and closes the valve.

11. The regulator of claim 10, wherein pressure exceeding 1 kg/cm$^2$ causes the valve to close.

* * * * *